United States Patent
Algesheimer et al.

(10) Patent No.: US 7,194,089 B2
(45) Date of Patent: Mar. 20, 2007

(54) METHOD FOR REDUCING A VALUE MODULO A SHARED SECRET

(75) Inventors: Joy Algesheimer, Zurich (CH); Jan Camenisch, Rueschlikon (CH); Victor Shoup, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 10/279,423

(22) Filed: Oct. 24, 2002

(65) Prior Publication Data

US 2003/0112969 A1 Jun. 19, 2003

(30) Foreign Application Priority Data

Oct. 24, 2001 (EP) .................................. 01811040

(51) Int. Cl.
*H04K 1/00* (2006.01)
*H04L 9/00* (2006.01)
*G06F 7/38* (2006.01)
*H04L 1/00* (2006.01)

(52) U.S. Cl. .......................... 380/28; 380/283; 708/490

(58) Field of Classification Search ..................... None
See application file for complete search history.

(56) References Cited

U.S. PATENT DOCUMENTS 4,405,829 A 9/1983 Rivest et al.
5,210,710 A * 5/1993 Omura ....................... 708/492

(Continued)

FOREIGN PATENT DOCUMENTS

EP 0350278 A2 * 1/1990

OTHER PUBLICATIONS

Shamir, A., How to Share a Secret, Communications of the ACM, 22, Nov. 11, 1979, 612-613.

*Primary Examiner*—Christopher Revak
(74) *Attorney, Agent, or Firm*—Cahn & Samuels, LLP; Ido Tuchman

(57) ABSTRACT

A method is provided for reducing a known value modulo a shared secret value among network devices exchanging messages in a network. The reduction results in a share of reduced value for each network device of a reduced value. Each network device has its share of known value and its share of shared secret value. It performs an inversion step for deriving from the share of shared secret value a share of the inverse of the shared secret value by using an approximation process, resulting in a share of inverse value; a multiplication step for deriving from the share of inverse value by use of the share of known value a share of multiplied inverse value; a rounding step for rounding the share of multiplied inverse value; and a calculation step for deriving the share of reduced value from the share of known value, the rounded share of multiplied inverse value, and the share of shared secret value. The method reduces values with a public modulus but also enables several network devices to reduce their known values with a modulus shared among them, but not becoming public. After the reduction, a faster computation with the reduced values or the shares thereof can be achieved. The proposed method can be implemented in threshold protocols in which computation occurs in a group where a modulus is not known but distributed. Furthermore, a network device is provided comprising a processor for executing the method incorporated in a computer program product.

12 Claims, 3 Drawing Sheets

U.S. PATENT DOCUMENTS

| | | | |
|---|---|---|---|
| 5,627,893 A * | 5/1997 | Demytko | 380/30 |
| 5,793,659 A * | 8/1998 | Chen et al. | 708/491 |
| 6,434,585 B2 * | 8/2002 | McGregor et al. | 708/491 |
| 6,769,062 B1 * | 7/2004 | Smeets et al. | 713/189 |
| 7,043,515 B2 * | 5/2006 | Stojancic | 708/491 |

* cited by examiner

METHOD FOR REDUCING A VALUE MODULO A SHARED SECRET

TECHNICAL FIELD

The present invention is related to a method and device for reducing a known value modulo a shared secret value among participating network devices in a network.

BACKGROUND OF THE INVENTION

Today's computer have to perform arithmetic operations, e.g. addition, multiplication, etc., with numbers and values that grow larger and larger such that the computer is not able to execute the computation in polynomial time. As there is an attempt of increasing security this trend will continue. When, for example, performing an ordinary operation of arithmetic with shares, the size of the shares increases and further computations become more and more inefficient. However there is currently no method available that reduces these shares by a shared integer such that the correct value modulo the integer can still be recombined.

Hence a scheme for reducing a known value modulo a shared secret value will be highly useful both for reducing a value and reducing a share of a value.

The size of a key in the so-called RSA scheme typically refers to the size of the modulus. N. Ronald Rivest, Adi Shamir, and Leonard Adleman developed the RSA scheme in 1977 that is a public-key cryptosystem that offers both encryption and digital signatures, i.e. authentication. RSA stands for the first letter in each of its inventors' last names. In the RSA scheme two primes, p and q, which compose the modulus N, should be of roughly equal length; this makes the modulus harder to factor than if one of the primes is much smaller than the other. If one chooses to use a 768-bit modulus, the primes should each have a length of approximately 384 bits. If the two primes are extremely close or their difference is close to any predetermined amount, then there is a potential security risk, but the probability that two randomly chosen primes are so close is negligible.

The best size for a modulus depends on one's security needs. The larger the modulus, the greater the security, but also the slower the RSA scheme operations. One should choose a modulus length upon consideration, first, of the value of the protected data and how long it needs to be protected, and, second, of how powerful one's potential threats might be.

Nevertheless, situations may occur where one has to compute in a group $Z_\phi$ with a modulus $\phi$ shared secretly. For example, consider N to be the publicly known RSA modulus and $\phi = \phi$ (N) to be the Euler function of N. Thus, the previously mentioned situation appears namely that on the one hand the security of the RSA scheme is based on the assumption that $\phi(N)$ remains secret but on the other hand the public key of the encryption scheme is chosen from the group $Z_\phi$, from which also the secret key is computed. Given a shared integer $\phi$ and a prime e, a protocol for computing a sharing of $e^{-1}$ mod $\phi$ is known. This protocol allows the calculation of the greatest common divisor (gcd) of a public and a shared secret value, i.e., gcd(e, $\phi$) in a distributed way.

Considered is the case where k parties or participating network devices hold additive shares of c, that is publicly known, and a shared integer and $\phi$. Together they wish to compute an additive sharing of a value d that is congruent to c mod $\phi$ and has a size about $\phi$ without revealing anything about $\phi$.

There is a need for a scheme for reducing a publicly known value by an unknown modulus that takes into consideration the distributed structure of an underlying system with k parties or participating network devices.

SUMMARY AND ADVANTAGES OF THE INVENTION

According to one aspect of the present invention there is provided a method for reducing a known value modulo a shared secret value among participating network devices. The devices exchange messages in a network. The reduction results in a share of reduced value for each participating network device of a reduced value. Each participating network device has its share of known value and its share of shared secret value and performs the following steps:

an inversion step for deriving from the share of shared secret value a share of the inverse of the shared secret value by using an approximation process, resulting in a share of inverse value;

a multiplication step for deriving from the share of inverse value by use of the share of known value a share of multiplied inverse value;

a rounding step for rounding the share of multiplied inverse value; and a calculation step for deriving the share of reduced value from the share of known value, the rounded share of multiplied inverse value, and the share of shared secret value.

According to a second aspect of the present invention there is provided a method for reducing a known value modulo a shared secret value among participating network devices. The devices exchange messages in a network. The reduction results in a reduced share of reduced value for each participating network device of a reduced value. Each participating network device has its share of known value and its share of shared secret value and performs the following steps:

an inversion step for deriving from the share of shared secret value a share of the inverse of the shared secret value by using an approximation process, resulting in a share of inverse value;

a re-sharing step for deriving from the share of known value shares of share of known value;

a multiplication step for deriving from the share of inverse value by use of the shares of share of known value a share of share of multiplied inverse value;

a rounding step for rounding the share of share of multiplied inverse value; and a calculation step for deriving the share of share of reduced value from the shares of share of known value, the rounded share of share of multiplied inverse value, and the share of shared secret value, a recombination step for deriving from the shares of share of reduced value the reduced share of reduced value.

In general, the methods above reduce values with a modulus. Typically, to do this the modulus has to be public. However, the methods show how a number of participating network devices can reduce their known values with a modulus that is shared among them and should not become public at any time. An advantage of the methods is that after the reduction a faster computation with the reduced or smaller values or the shares thereof can be achieved. This leads to an increased computing power. The proposed methods can be implemented as basic methods in various protocols. For example, there exist a number of threshold protocols in which computations need to be done in a group where a modulus is not known but distributed. All of these protocols take advantage of the presented methods for reducing a known value modulo a shared secret value that is performed in a distributed way.

The multiplication step uses a distributed multiplication method. This has the advantage that each participating network device can compute its own shares without relying on a central server.

The rounding step can comprise extracting from the share of multiplied inverse value its integer value. This results in the rounded share of multiplied inverse value. In general a floor operation can be applied. This is easy in view of computation, because then only some bits are cut without further computation.

The approximation process can comprise a Newton iteration. This has the advantage that a quadratic convergence is achievable which leads to a faster approach and therefore to the desired result.

In a preferred embodiment, the steps of the multiplication step, the rounding step, and the calculation step can be repeated in a loop. This can be done until a satisfying reduction is reached.

The re-sharing step can comprise a randomizing step for deriving from the share of known value randomized shares of share of known value. This has the advantage that a recombination of the shared values is possible without revealing the shared secret value.

The reduced value is the sum of each share of reduced value. The reduced value does not need to be reconstructed by the participating network device, because a further computation with the shares thereof is sufficient.

In accordance with a third aspect of the present invention there is provided a network device comprising:
a computer program product according to the method;
a processor for executing the method;
the processor having access to exchanged messages in the network.

Embodiments of this aspect of the invention therefore employ similar principles to embodiments of the first and second aspect of the invention.

In a first preferred embodiment, the size of the value determined by the recombined shares should be smaller than $|\phi|+\log k+2$ but the size of the shares themselves can be bigger. In a second preferred embodiment, the size of the value determined by the recombined shares should be smaller than $|\phi|+\log k+2$ plus the shares themselves that are reduced modulo $\phi$ and therefore the size of the shares is smaller than $|\phi|+\log k+2$, too.

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

Glossary

The following are informal definitions to aid in the understanding of the description.

| | |
|---|---|
| $p_i$ | participating network device ($p_1$, $p_2$, $p_3$, $p_4$) |
| $c$ | known value |
| $\langle c \rangle_i$ | share of known value or additive share of c |
| $\langle \langle c \rangle_i \rangle_j$ | shares of share of known value |
| $\langle \langle c \rangle_i \rangle_j^R$ | randomized shares of share of known value |
| $\phi$ | shared secret value |
| $\langle \varphi \rangle_i$ | share of shared secret value or additive share of $\phi$ |
| $d$ | reduced value |
| $\langle d \rangle_i$ | share of reduced value or additive share of d |
| $\langle d \rangle_i^*$ | reduced share of reduced value |
| $\langle \langle d \rangle_i \rangle_j$ | share of share of reduced value |
| $\left\langle \frac{1}{\varphi} \right\rangle_i'$ | share of inverse value |
| $\left\langle \frac{c}{\varphi} \right\rangle_i$ | share of multiplied inverse value |
| $\left\lfloor \left\langle \frac{c}{\varphi} \right\rangle_i \right\rfloor$ | rounded share of multiplied inverse value |
| $\left\langle \left\langle \frac{c}{\varphi} \right\rangle_i \right\rangle_j$ | share of share of multiplied inverse value |
| $\left\lfloor \left\langle \left\langle \frac{c}{\varphi} \right\rangle_i \right\rangle_j \right\rfloor$ | rounded share of share of multiplied inverse value |

Under the term share is understood a part of a joint value or recombined value. In general, shares of a value are denote of by $\langle \cdot \rangle$. The expression $\langle \cdot \rangle_i$ refers to the i-th additive share, as the sum of the shares results in the joint value or recombined value. Moreover, rounded shares of a value are denote of by $\lfloor . \rfloor$ indicating, for example, a floor operation.

In the following description the expression reduced share of reduced value $\langle d \rangle_i^*$ differs from the expression share of reduced value $\langle d \rangle_i$ in that the reduced share of reduced value $\langle d \rangle_i^*$ has the additional property of being reduced itself compared to the share of reduced value $\langle d \rangle_i$.

DETAILED DESCRIPTION OF A PREFERRED EMBODIMENT

With general reference to the figures, a method and device for reducing a known value modulo a shared secret value among participating network devices are described in more detail below.

Figure 1:
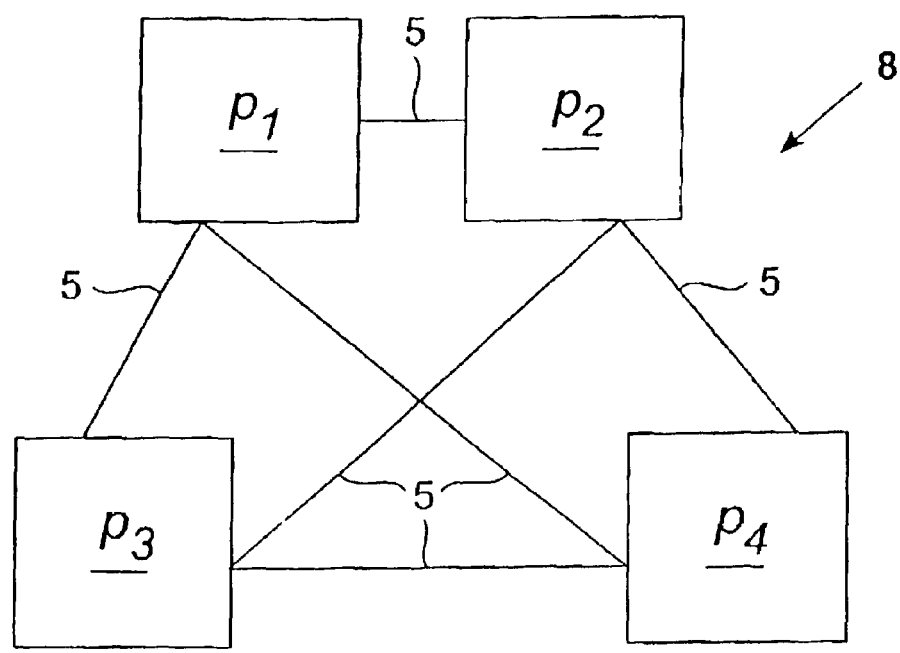
FIG. 1 shows a typical network with multiple distributed participating network devices.

Turning to FIG. 1 which shows an example of a common computer system 8. It comprises k, here four, participating network devices $p_1$, $p_2$, $p_3$, $p_4$ which are connected via communication lines 5 to a network. The system, where the reduction of a known value modulo a shared secret value can be achieved, has a decentralized structure. That means each participating network device $p_1$, $p_2$, $p_3$, $p_4$ performs its own calculation. Each participating, network device $p_1$, $p_2$, $p_3$, $p_4$ may be any type of computer device or network device known in the art from a computer on a chip or a wearable computer to a large computer system. The communication lines can be any communication means commonly known to transmit data or messages from one participating network device to another. For instance, the communication lines may be either single, bi-directional communication lines 5 between each pair of participating network devices $p_1$, $p_2$, $p_3$, $p_4$ or one unidirectional line in each direction between each pair of participating network devices $p_1$, $p_2$, $p_3$, $p_4$. The common computer system 8 is shown to facilitate the description of the following methods for reducing a known value modulo a shared secret value.

In the following two examples, which differ in terms of their outputs, are described. The first one computes shares of c mod φ(N), such that the size of the value determined by the recombined shares is smaller than |N|+log k+2 but the size of the shares themselves is much bigger. The second example is an extension of the first one as it calculates with the shares of the shares and also provides shares of c mod φ(N), such that the size of the value determined by the recombined shares is smaller than |N|+log k+2 plus the shares themselves are reduced modulo φ(N) and therefore the size of the shares is smaller than |N|+log k+2, too.

It is considered the case where k participating network devices $p_1$, $p_2$, $p_3$, $p_4$ know one modulus N which is the product of two equally sized primes (RSA modulus), and hold additive shares of a known value c and a shared secret value φ(N), where φ(N) is the Euler function of N. Together they wish to compute an additive sharing of a reduced value d that is congruent to c mod φ(N) and has a size about φ(N) without revealing anything about the φ(N).

In the following some mathematical aspects according to the present invention are addressed in more detail. When performing ordinary operations of arithmetic with shares, the size of the shares increases and further computations become more and more inefficient. The following indicates in general how to reduce those shares by a shared secret value φ such that a correct reduced value d modulo the shared secret value φ can be recombined, as can be expressed by:

$$d \equiv c \bmod \varphi = c - \left\lfloor \frac{c}{\varphi} \right\rfloor \varphi$$

The computation of $$\left\lfloor \frac{c}{\varphi} \right\rfloor$$

is not trivial, because of the fact that $$\left\langle \frac{1}{\varphi} \right\rangle_i \neq \frac{1}{\langle \varphi \rangle_i},$$

and is therefore split into a) the computation of the inverse of the shared secret value φ over the integer, i.e., computing $$\frac{1}{\varphi}$$

distributively, and b) the computation of a $\lfloor . \rfloor$ operation.

a) To solve the inversion issue an approximation or iteration technique, here called distributed Newton iteration, can be applied as such techniques are known to a skilled person. With this technique the participating network devices $p_1$, $p_2$, $p_3$, $p_4$ are able to compute shares of a sufficiently close approximation to $$\frac{1}{\varphi}.$$

A multiplication leads then to $$\frac{c}{\varphi}.$$

b) The computation of the $\lfloor . \rfloor$ operation, i.e. the rounding operation, is a matter of how precise one wants to achieve the goal of computing c mod φ. However, an appearing error has an affection of less then k bits on the reconstructed or reduced value d, where k is the number of participating network devices $p_1$, $p_2$, $p_3$, $p_4$.

Figure 2:
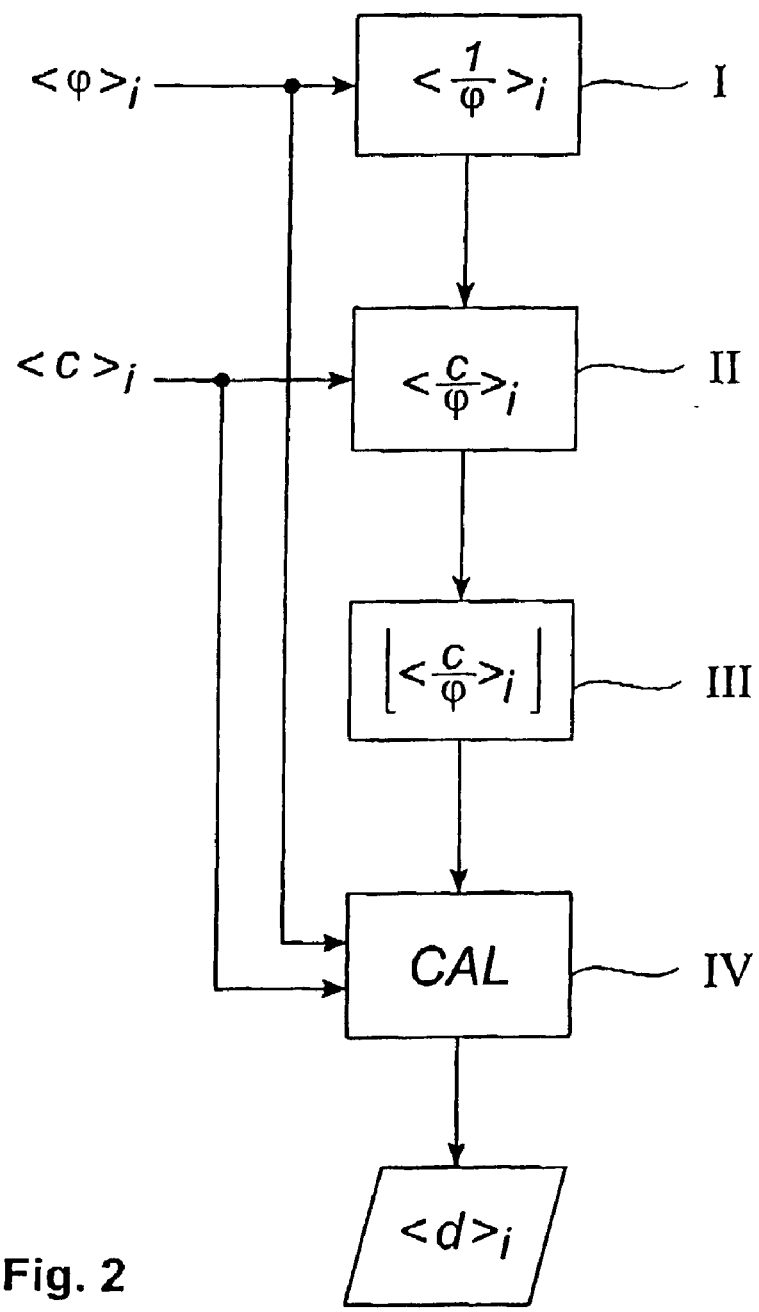
FIG. 2 shows a schematic diagram for reducing a known value modulo a shared secret value among participating network devices according to a first aspect of the present invention.

In FIG. 2, a flow chart for a first algorithm for reducing a known value c modulo a shared secret value φ among participating network devices $p_1$, $p_2$, $p_3$, $p_4$ is shown. The participating network devices $p_1$, $p_2$, $p_3$, $p_4$ exchange a series of messages that being sent and received by each participating network device $p_1$, $p_2$, $p_3$, $p_4$. The reduction results in a share of reduced value $<d>_i$ for each participating network device $p_1$, $p_2$, $p_3$, $p_4$ of the reduced value d. Each participating network device $p_1$, $p_2$, $p_3$, $p_4$ has its share of known value $<c>_i$ and its share of shared secret value $<\varphi>_i$ and performs the following steps as labeled with Roman numbers in the figure. In an inversion step I a share of the inverse of the shared secret value φ is derived from the share of shared secret value $<\varphi>_i$ by using an approximation process. A preferred approximation process is the Newton iteration or distributed Newton iteration, but also other suitable approximation processes can be applied. The result of the approximation process is a share of inverse value $$\left\langle \frac{1}{\varphi} \right\rangle_i.$$

Next, a multiplication step II for deriving from the share of inverse value $$\left\langle \frac{1}{\varphi} \right\rangle_i$$

a share of multiplied inverse value $$\left\langle \frac{c}{\varphi} \right\rangle_i$$

is performed by use of the share of known value $<c>_i$. It follows a rounding step III for rounding the share of multiplied inverse value $$\left\langle \frac{c}{\varphi} \right\rangle_i$$

resulting in a rounded share of multiplied inverse value $$\left\lfloor \left\langle \frac{c}{\varphi} \right\rangle_i \right\rfloor.$$

Thereby a floor operation is preferred. In a calculation step IV the share of reduced value $<d>_i$, as indicated in the result box, is then derived from the share of known value $<c>_i$, the rounded share of multiplied inverse value $$\left\lfloor \left\langle \frac{c}{\varphi} \right\rangle_i \right\rfloor,$$

and the share of shared secret value $\varphi_i$. In detail, the rounded share of multiplied inverse value $$\left\lfloor \left\langle \frac{c}{\varphi} \right\rangle_i \right\rfloor$$

is multiplied with the share of shared secret value $<\varphi>_i$ and the result is subtracted from the share of known value $<c>_i$. This can be expressed by $$\langle d \rangle_i \equiv \langle c \rangle_i - \left\lfloor \left\langle \frac{c}{\varphi} \right\rangle_i \right\rfloor \langle \varphi \rangle_i.$$

In a further embodiment, the steps of the multiplication step II, the rounding step III, and the calculation step IV can be repeated in a loop (not shown). This can be done until a satisfying reduction is reached, i.e. the share of reduced value $<d>_i$ is as small as desired.

Figure 3:
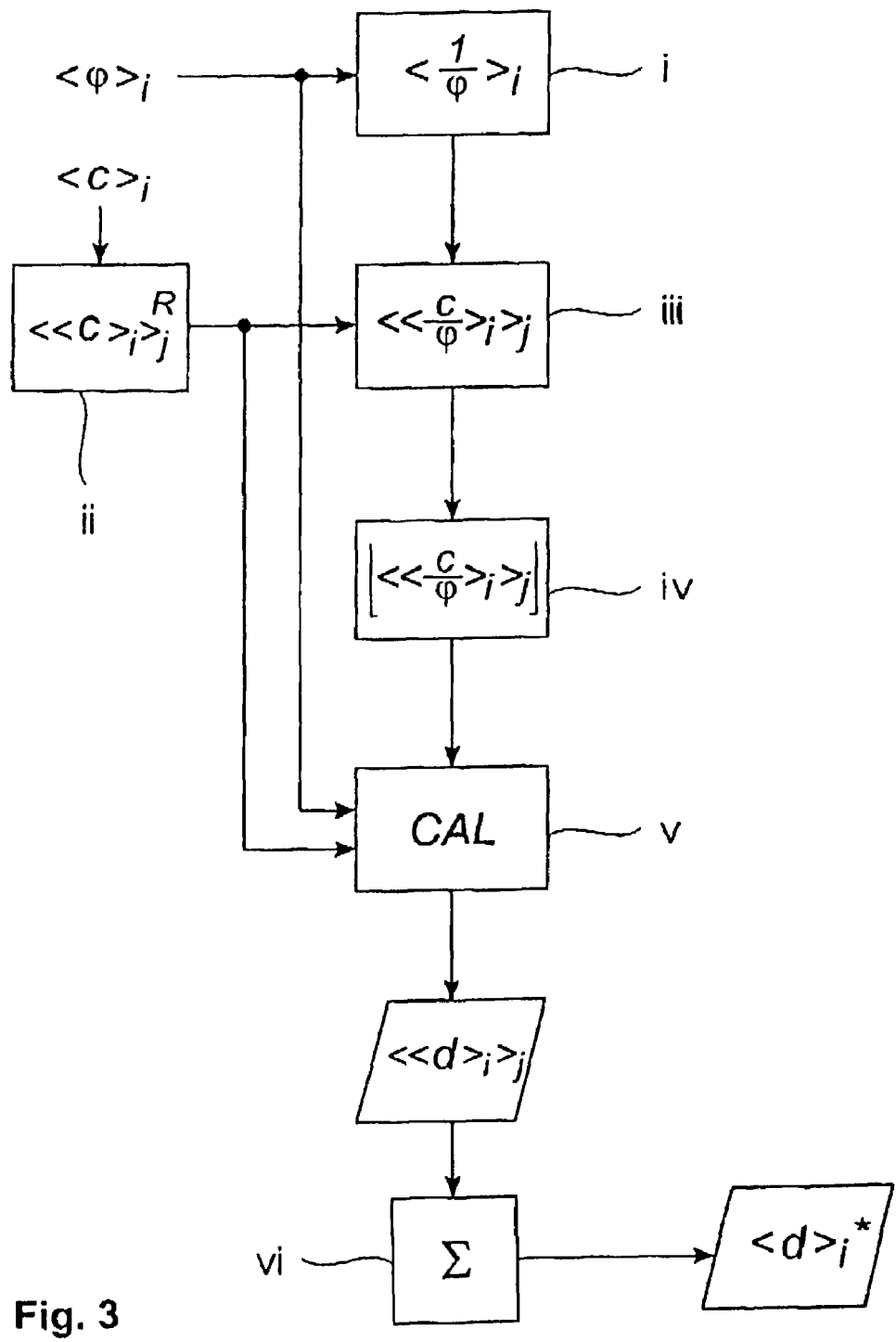
FIG. 3 shows a schematic diagram for reducing a known value modulo a shared secret value among participating network devices according to a second aspect of the present invention.

FIG. 3 shows a flow chart for a second algorithm for reducing a known value c modulo a among participating network devices $p_1, p_2, p_3, p_4$. The participating network devices $p_1, p_2, p_3, p_4$ exchange a series of messages that being sent and received by each participating network device $p_1, p_2, p_3, p_4$. The reduction results in a reduced share of reduced value $<d>_i^*$ for each participating network device $p_1, p_2, p_3, p_4$ of a reduced value d. Each participating network device $p_1, p_2, p_3, p_4$ has its share of known value $<c>_i$ and its share of shared secret value $<\varphi>_i$ and performs the following steps as labeled with small Roman numbers in the figure. In an inversion step i a share of the inverse of the shared secret value $\varphi$ is derived from the share of shared secret value $<\varphi>_i$ by using an approximation process, preferably the Newton iteration. The result of the approximation process is a share of inverse value $$\left\langle \frac{1}{\varphi} \right\rangle_i.$$

From the share of known value $<c>_i$ are derived in a re-sharing step ii shares of share of known value $<<c>_i>_j$ or randomized shares of share of known value $<<c>_i>_j^R$ as described below. The further calculation should be adapted when randomized values are used. Next, in a multiplication step iii a share of share of multiplied inverse value $$\left\langle \left\langle \frac{c}{\varphi} \right\rangle_i \right\rangle_j$$

is derived from the share of inverse value $$\left\langle \frac{1}{\varphi} \right\rangle_i$$

by use of the shares of share of known value $<<c>_i>_j$. In a rounding step iv the share of share of multiplied inverse value $$\left\langle \left\langle \frac{c}{\varphi} \right\rangle_i \right\rangle_j$$

is rounded, preferably by an off rounding operation. In a calculation step v the share of share of reduced value $<<d>_i>_j$, as indicated in the result box, is derived from the shares of share of known value $<<c>_i>_j$, the rounded share of share of multiplied inverse value $$\left\lfloor \left\langle \left\langle \frac{c}{\varphi} \right\rangle_i \right\rangle_j \right\rfloor,$$

and the share of shared secret value $<\varphi>_i$. In detail, the rounded share of share of multiplied inverse value $$\left\lfloor \left\langle \left\langle \frac{c}{\varphi} \right\rangle_i \right\rangle_j \right\rfloor$$

is multiplied with the share of shared secret value $<\varphi>_i$ and the result is subtracted from the shares of share of known value $<<c>_i>_j$. In a recombination step vi the reduced share of reduced value $<d>_i^*$ is derived from the shares of share of reduced value $<<d>_i>_j$ by a sum operation. The reduced share of reduced value $<d>_i^*$ is the desired result and is indicated in the result box after the recombination step vi.

In a further embodiment, the re-sharing step ii can further comprise a randomizing step (not shown) for deriving from the share of known value $<c>_i$ randomized shares of share of known value $<<c>_i>_j^R$ as indicated in FIG. 3. It is clear that then the following calculations are performed with the randomized values and should therefore be adapted accordingly. It is advantageous that the recombination step vi removes the randomization without further calculations. The randomization has the advantage that the recombination of the shared values, i.e. the shares of share of reduced value $<<d>_i>_j$, can be performed without revealing any information about the shared secret value $\phi$.

The algorithms described above can be used for an efficient distributed generation of safe-prime RSA moduli. This means, the modulus can be generated in a distributed way which increases the security of a system.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method of reducing a known value of a shared secret value among participating network devices exchanging messages in a network, the reduction resulting in a share of reduced value for each participating network device having its share of known value and its share of shared secret value, wherein each participating network device performs:
an inversion step for deriving from the share of shared secret value a share of the inverse of the shared secret value by using an approximation process, resulting in a share of inverse value;
a multiplication step for deriving from the share of inverse value by use of the share of known value a share of multiplied inverse value;
a rounding step for rounding the share of multiplied inverse value; and
a calculation step for deriving the share of reduced value from the share of known value, the rounded share of multiplied inverse value, and the share of shared secret value.

2. The method according to claim 1, wherein the multiplication step comprises using a distributed multiplication method.

3. The method according to claim 1, wherein the rounding step comprises extracting from the share of multiplied inverse value its integer value, resulting in the rounded share of multiplied inverse value.

4. The method according to claim 1, further comprising repeating the multiplication step, the rounding step, and the calculation step in a loop.

5. A method for reducing a known value modulo a shared secret value among participating network devices exchanging messages in a network, the reduction resulting in a reduced share of reduced value for each participating network device of a reduced value, each participating network device having its share of known value and its share of shared secret value, wherein each participating network device performs:
an inversion step for deriving from the share of shared secret value a share of the inverse of the shared secret value by using an approximation process, resulting in a share of inverse value;
a re-sharing step for deriving from the share of known value shares of share of known value;
a multiplication step for deriving from the share of inverse value by use of the shares of share of known value a share of share of multiplied inverse value;
a rounding step for rounding the share of share of multiplied inverse value;
a calculation step for deriving the share of share of reduced value from the shares of share of known value, the rounded share of share of multiplied inverse value, and the share of shared secret value; and
a recombination step for deriving from the shares of share of reduced value the reduced share of reduced value.

6. The method according to claim 1, wherein the approximation process comprises a Newton iteration.

7. The method according to claim 5, wherein the rounding step comprises extracting from the share of share of multiplied inverse value its integer value, resulting in the rounded share of share of multiplied inverse value.

8. The method according to claim 5, wherein the re-sharing step further comprises a randomizing step for deriving from the share of known value randomized shares of share of known value.

9. The method according to claim 8, wherein the calculation step further uses the randomized shares of share of known value.

10. A computer program product comprising a computer useable medium including a computer readable program, wherein the computer readable program when executed on a computer causes the computer to:
derive from a share of shared secret value a share of the inverse of the shared secret value by using an approximation process, resulting in a share of inverse value;
derive from the share of inverse value by use of the share of known value a share of multiplied inverse value;
round the share of multiplied inverse value; and
derive the share of reduced value from the share of known value, the rounded share of multiplied inverse value, and the share of shared secret value.

11. The computer program product according to claim 10, wherein the computer readable program further causes the computer to:
repeat deriving a multiplied inverse value, rounding the share of multiplied inverse value, and deriving the share of reduced value.

12. A network device comprising:
a computer program product comprising a computer useable medium including a computer readable program, wherein the computer readable program when executed on a computer causes the computer to:

derive from a share of shared secret value a share of the inverse of the shared secret value by using an approximation process, resulting in a share of inverse value;

derive from the share of inverse value by use of the share of known value a share of multiplied inverse value;

round the share of multiplied inverse value; and derive the share of reduced value from the share of known value, the rounded share of multiplied inverse value, and the share of shared secret value; and a processor for executing the method;

the processor having access to exchanged messages in the network.

* * * * *